United States Patent [19]
Hutchings et al.
[11] Patent Number: 4,963,287
[45] Date of Patent: Oct. 16, 1990

[54] AQUEOUS ALKALI METAL HALOGENITE COMPOSITIONS

[75] Inventors: Richard S. Hutchings; Saundra L. Nolte; Jeffrey S. Weaver, all of Cincinnati, Ohio

[73] Assignee: The Drackett Company, Cincinnati, Ohio

[21] Appl. No.: 267,650

[22] Filed: Nov. 1, 1988

Related U.S. Application Data

[63] Continuation-in-part of Ser. No. 54,338, May 26, 1987, abandoned.

[51] Int. Cl.⁵ ....................... C01B 11/00; C01B 11/10
[52] U.S. Cl. ............................... 252/187.23; 252/103; 252/174.11; 252/DIG. 14; 422/28; 422/37
[58] Field of Search .......... 252/174.11, 103, DIG. 14, 252/187.23; 422/28, 29, 37; 424/44

[56] References Cited

U.S. PATENT DOCUMENTS

| | | | |
|---|---|---|---|
| Re. 31,779 | 12/1984 | Alliger | 252/187.23 |
| 2,071,091 | 2/1937 | Taylor | 167/17 |
| 2,145,062 | 1/1939 | Taylor et al. | 8/108 |
| 2,253,368 | 4/1941 | Dubeau | 8/108 |
| 2,358,866 | 9/1944 | MacMahon | 252/187 |
| 2,477,631 | 8/1949 | Levy et al. | 8/105 |
| 2,482,891 | 9/1949 | Aston | 252/187 |
| 2,711,363 | 6/1955 | Waibel | 23/85 |
| 2,900,219 | 8/1959 | Waibel | 8/108 |
| 2,988,514 | 6/1961 | Robson | 252/187 |
| 3,046,185 | 7/1962 | Buonanno et al. | 162/161 |
| 3,065,040 | 11/1962 | Waibel | 8/108 |
| 3,082,146 | 3/1963 | Wentworth et al. | 167/17 |
| 3,123,521 | 3/1964 | Wentworth et al. | 167/17 |
| 3,271,242 | 9/1966 | McNicholas | 167/17 |
| 3,386,915 | 6/1968 | Rutschi et al. | 210/62 |
| 3,537,894 | 11/1970 | Thompson | 134/2 |
| 3,547,573 | 12/1970 | Tourdot et al. | 8/108 |
| 3,580,851 | 5/1971 | Heid et al. | 252/99 |
| 3,591,515 | 7/1971 | Lovely | 252/187 |
| 3,790,343 | 2/1974 | Ikeda | 8/108 |
| 3,836,475 | 9/1974 | Kirner | 252/187 R |
| 3,914,185 | 10/1975 | Iranuorato | 252/546 |
| 3,970,596 | 7/1976 | Klisch | 252/546 |
| 4,073,888 | 2/1978 | Snyder | 424/149 |
| 4,084,747 | 4/1978 | Alliger | 239/4 |
| 4,215,006 | 7/1980 | Mookherjee | 252/174.11 |
| 4,287,084 | 9/1981 | Boden | 252/187 H |
| 4,330,425 | 5/1982 | Boden | 252/187 H |
| 4,330,531 | 5/1982 | Alliger | 424/149 |
| 4,332,691 | 6/1972 | Beavan | 252/96 |
| 4,342,663 | 8/1982 | Boden | 252/186.36 |
| 4,499,077 | 2/1985 | Stockel et al. | 424/149 |
| 4,511,489 | 4/1985 | Requejo | 252/172 |
| 4,587,032 | 5/1986 | Rogers | 252/174.17 |
| 4,690,772 | 9/1987 | Tell et al. | 252/106 |
| 4,692,277 | 9/1987 | Siklosi | 252/558 |
| 4,790,950 | 12/1988 | Hutchings | 252/187.23 |
| 4,861,514 | 8/1989 | Hutchings | 252/187.23 |
| 4,873,013 | 10/1989 | Hutchings | 252/187.23 |
| 4,880,566 | 11/1989 | Hutchings | 252/187.23 |

FOREIGN PATENT DOCUMENTS

| | | |
|---|---|---|
| 955848 | 10/1964 | Canada . |
| 021581 | 1/1981 | European Pat. Off. . |
| 142883 | 5/1985 | European Pat. Off. . |
| 159923 | 10/1985 | European Pat. Off. . |
| 204472 | 12/1986 | European Pat. Off. . |
| 1453380 | 8/1966 | France . |
| 701572 | 3/1966 | Italy . |
| 0109900 | 5/1987 | Japan . |
| 1571975 | 7/1980 | United Kingdom . |
| 2076010 | 5/1984 | United Kingdom . |

*Primary Examiner*—Robert L. Stoll
*Assistant Examiner*—Joseph Anthony
*Attorney, Agent, or Firm*—Sandra M. Nolan

[57] ABSTRACT

Aqueous cleaner compositions containing an alkali metal halogenite, for example, sodium chlorite; a perfume normally chemically incompatible with the halogenite in aqueous media, and a stabilizing amount of an anionic surfactant, the inclusion of which enhances the stability of the perfume-containing aqueous halogenite compositions.

22 Claims, No Drawings

AQUEOUS ALKALI METAL HALOGENITE COMPOSITIONS

This is a continuation-in-part of Ser. No. 054,338, filed 5-26-87, now abandoned.

FIELD OF INVENTION

The present invention relates to aqueous, alkaline cleaner compositions containing an alkali metal halogenite, for example, sodium chlorite, $NaClO_2$, and a stabilizable perfume normally incompatible with said halogenite in aqueous media, the perfume being compatible therewith in view of the inclusion within said composition of a stabilizing amount of a stabilizer that is an anionic surfactant.

BACKGROUND OF INVENTION

Aqueous alkaline metal halogenite compositions are well known for use in the textile industry wherein the halogenite, especially sodium chlorite, is a source of chlorine dioxide gas, a strong bleachant. Below about pH 9, there is a sufficient concentration of $H^+$ ions to commence conversion of the chlorite ion to chlorine dioxide, especially at elevated temperatures. As the concentration of chlorine dioxide in the aqueous solution increases, aqueous alkali metal halogenite compositions become more acidic and the rate of conversion of sodium chlorite to chlorine dioxide increases.

French Patent No. 1,453,380 discloses alkali metal halogenite compositions, especially containing sodium chlorite, containing an alkali-medium-stable surface active agent having a saturated aliphatic chain and which is selected from among saturated compounds or arylaliphatic compounds having an aliphatic portion that is saturated or is very resistant to oxidation, condensed with an oxyethylene chain comprising at least 8 ethoxy groups, the terminal hydroxy group of which is esterified by a nonoxidizable acid. In particular, the French patent discloses as the stable surfactant alkali salts of the condensation product of a substituted phenol having a saturated aliphatic chain with an oxyethylene chain having at least 8 hydroxy groups, the terminal hydroxy group of which is esterified by an inorganic acid such as phosphoric acid or sulfuric acid, for example, the potassium salt of the phosphoric diester of phenol condensed with 10 molecules with ethylene oxide having the formula:

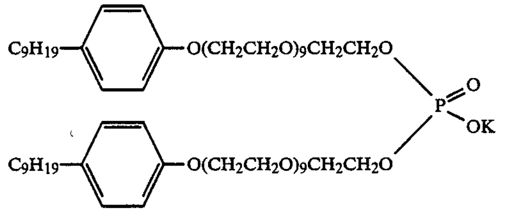

According to the French patent, salification of the terminal hydroxy group is indispensable in order to avoid oxidation of the surface-active agent in alkaline medium. Typically, the compositions of the French patent have an initial sodium chlorite concentration of about 14%.

U.S. Pat. No. 3,580,851 to Heid, et al., discloses sodium chlorite compositions containing a stable surface-active agent carboxylic acids or their alkaline salts having the general formula:

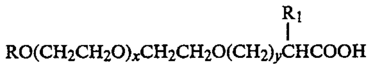

wherein R is $-C_nH_{2n+1}$ or

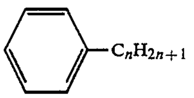

n denotes an integer of from 6 to 18, preferably 7 to 12; x is an integer of from 6 to 30, preferably from 9 to 19; y is 0 or 1, and $R_1$ is hydrogen or metal. Particularly preferred ether carboxylic acids are the reaction products of ethoxylated alkyl phenols and ethoxylated alcohols with monochloroacetic acid and ether carboxylic acids obtained by the addition of acrylonitrile or methacrylonitrile to ethoxylated alkyl phenols or alcohols and subsequent saponification of the formed nitriles. Preferably, the weight ratio of sodium chlorite to surfactant ranges from 10:1 to 1:1.

In the paper industry, sodium chlorite has been used to prevent mold and growth in paper mill "white" water, as disclosed in U.S. Pat. No. 3,046,185 to Buonanno. Italian Patent No. 701,572 discloses an aqueous composition containing a mixture of sodium hypochlorite and sodium chlorite for use in the purification of water, especially surface water as found in streams, lakes, etc., as well as for use in laundering because of its sterilizing and bleaching effect.

Applicant has found that alkali metal halogenite solutions, especially sodium chlorite solutions, are suitable for use in household and janitorial cleaning chores, for example, cleaning of tiles, porcelain surfaces, and drains.

For such compositions, especially for compositions for household use, the inclusion of a perfume is preferred. The perfume provides a pleasing fragrance to the composition, and when used in connection with, for example, the cleaning of toilet bowls, would provide an air freshener utility.

It has been observed, however, that many perfumes, which are complex mixes of natural and synthetic oils having oxidizable substituent groups, are not stable in the alkali metal halogenite compositions. Instability of the perfume is manifest by the formation of chlorine dioxide as within the composition, by loss of perfume intensity, and lowering of composition pH. Concomitant with the formation of chlorine dioxide is the loss of the alkali metal halogenite. Moreover, the odor of chlorine dioxide is penetrating and unpleasant, and would tend to override the fragrance, especially after even partial depletion thereof.

It has been found that for many perfumes that are otherwise unstable in aqueous alkaline metal halogenite compositions, inclusion can be successfully achieved by stabilizing the system with an effective amount of an anionic surfactant.

Accordingly, it is an object of the present invention to provide an aqueous cleaning composition comprising an alkali metal halogenite solution containing therein a perfume that does not lose to an appreciable extent its characteristic fragrance.

It is a further and primary object of the present invention to provide such composition wherein the included perfume does not react appreciably with the alkali metal halogenite to release in excess of trace levels of chlorine dioxide gas, at the pH of the composition.

These and other objects and advantages of the present invention will be more readily understood upon reading the detailed disclosure of the invention, a summary of which follows.

SUMMARY OF THE INVENTION

Compositions of the present invention comprise an alkali metal halogenite, for example, sodium chlorite, $NaClO_2$, a stabilizable perfume that is normally chemically incompatible with the halogenite in aqueous media, and a stabilizer that is an anionic surfactant and which is present in the composition at least in an amount effective to stabilize not only the perfume but also the composition, as evidenced by the substantial absence of chlorine dioxide in the composition.

Optionally, the anionic surfactant included in the composition may be in an amount that is greater than necessary to provide the aforesaid stabilization, to enhance the composition's cleaning efficacy, provided that such increase in said anionic surfactant concentration does not jeopardize the stability of the composition.

The alkali metal halogenite typically is present in an amount of about 5% or less by weight of the composition, sodium chlorite being the preferred species thereof. The perfume is typically present in an amount of from about 0.01 to about 3% by weight of the composition. The perfume is typically a natural or synthetic perfume oil, as discussed in greater detail below.

The stabilizer is present in an amount that is effective to prevent interaction of the perfume with the halogenite ions formed by dissociation of the alkali metal halogenite in aqueous media. Preferably, the stabilizer is present in an amount of from about 1 to 20% by weight of the composition. As hereinafter indicated, many classes of anionic surfactant have been found to be suitable for the practice of the present invention.

For best stabilization, the alkaline compositions of the present invention have a pH of about 9 and above, preferably from about 9.0 to about 10.5.

DETAILED DESCRIPTION OF THE INVENTION AND PREFERRED EMBODIMENT

In attempting to prepare perfume-containing aqueous cleaning compositions comprising sodium chlorite and including a perfume, it was found that the resulting composition contained generally unacceptable amounts of chlorine dioxide gas. Such chlorine dioxide gas is unacceptable because of its unpleasant odor.

Applicants have found, surprisingly, that the inclusion of an anionic surfactant prevents the formation of chlorine dioxide gas in such compositions containing sodium chlorite and the perfume. It is believed that the inclusion of the anionic surfactant within the composition is attributable to micellular attraction between the perfume and the surfactant anion.

Accordingly, the compositions of the present invention are aqueous, alkaline cleaning compositions preferably having a pH of about 9 and above and comprising on a weight basis from about 0.01 to about 5%, preferably about 0.1% to about 0.5%, of an alkali metal halogenite, from about 0.01 to about 3% on an active basis of a perfume, said perfume normally chemically incompatible with the said halogenite in aqueous, alkaline media, and a stabilizer that is an anionic surfactant, preferably having an alkali metal or ammonium cation, said stabilizer being present in the composition at least in an amount effective to stabilize the composition as well as the perfume, as evidenced by a substantial absence of chlorine dioxide therein.

By the practice of the present invention, sodium chlorite compositions containing the otherwise incompatible perfume, which compositions do not produce in excess of a trace concentration of chlorine dioxide within one month of preparation, preferably three months, most preferably six months, can be made. By trace concentration is meant a level of chlorine dioxide detectable by conventional analytical means and/or by olefactory sensory evaluation, usually less than about 10 ppm, preferably less than about 5 ppm, in said composition.

Sodium chlorite is preferably present in an amount of from about 0.5 to about 5%, most preferably 1 to about 3%, by weight of the composition. Above about 5% of the chlorite provides a composition having too high an ionic strength for successful stabilization, although with proper selection of perfume and stabilizer, higher sodium chlorite levels may be achievable.

Typically, the perfume incorporated in the composition of the present invention is a mixture of organic compounds admixed so that the combined odors of the individual components produce a pleasant or desired fragrance. While perfumes are generally mixtures of various materials, individual compounds may also be used as the perfume ingredient, for example, methyl salicylate. The perfume compositions generally contain a main note or the "bouquet" of the perfume composition, modifiers which round off and accompany the main note, fixatives including odorous substances that lend a particular note to the perfume throughout each of the stages of evaporation, substances which retard evaporation, and top notes which are usually low-boiling, fresh-smelling materials.

Perfumery raw materials may be divided into three main groups: (1) the essential oils and products isolated from these oils; (2) products of animal origin; and (3) synthetic chemicals. Many of these materials include substituent groups, for example, the carbonyl group in aldehydes and ketones; the hydroxyl group in alcohols; the acyl group in esters; the C=O groups in lactones; nitrile groups, and the oxy moiety in ethers, that are susceptible to varying degrees of attack in an oxidative media.

The essential oils consist of complex mixtures of volatile liquid and solid chemicals found in various parts of plants. Mention may be made of oils found in flowers, e.g., jasmine, rose, mimosa, and orange blossom; flowers and leaves, e.g., lavender and rosemary; leaves and stems, e.g., geranium, patchouli, and petitgrain; barks, e.g., cinnamon; woods, e.g., sandalwood and rosewood; roots, e.g., angelica; rhizomes, e.g., ginger; fruits, e.g., orange, lemon, and gergamot; seeds, e.g., aniseed and nutmeg; and resinous exudations, e.g., myrrh. These essential oils consist of a complex mixture of chemicals, the major portion thereof being terpenes, including hydrocarbons of the formula $(C_5H_8)_n$ and their oxygenated derivatives. Hydrocarbons such as these give rise to a large number of oxygenated derivatives, e.g., alcohols and their esters, aldehydes and ketones. Some of the more important of these are geraniol, citronellol and terpineol, citral and citronellal, and camphor. Other constituents include aliphatic aldehydes and also aromatic compounds including phenols such as eugenol. In some instances, specific compounds may be isolated from the essential oils, usually by distillation in a commercially pure state, for example, geraniol and citronellal from citronella oil; citral from lemon-grass oil; eugenol from clove oil; linalool from rosewood oil; and safrole from sassafras oil. The natural isolates may also be chemically modified as in the case of citronellal to hydroxy citronellal, citral to ionone, eugenol to vanillin, linalool to linalyl acetate, and safrol to heliotropin.

Animal products used in perfumes include musk, ambergris, civet and castoreum, and are generally provided as alcoholic tinctures.

The synthetic chemicals include not only the synthetically made, also naturally occurring isolates mentioned above, but also include their derivatives and compounds unknown in nature, e.g., isoamylsalicylate, amylcinnamic aldehyde, cyclamen aldehyde, heliotropin, ionone, phenylethyl alcohol, terpineol, undecalactone, and gamma nonyl lactone.

Perfume compositions as received from the perfumery house may be provided as an aqueous or organically solvated composition, and may include as a hydrotrope or emulsifier a surface-active agent, typically an anionic or nonionic surfactant, in minor amount. The perfume compositions are quite usually proprietary blends of many different fragrance compounds. However, one of ordinary skill in the art, by routine experimentation, may easily determine whether such a proprietary perfume blend is suitably stabilized in the composition of the present invention, as illustrated in the examples herein.

The anionic surfactant is included in an effective amount in order to stabilize the perfume, but may be included in an amount of up to about 20% by weight of the composition, and preferably are included in an amount of from about 1 to about 10% by weight of the composition, most preferably from about 2 to about 7% by weight of the composition. The effective amount of the anionic surfactant beneficially not only stabilizes the composition but also provides detergency. The cleaning power of the composition is further enhanced by including the anionic surfactant at a level even greater than the effective level.

Broadly, the anionic surfactants are water-soluble alkyl or alkylaryl compounds, the alkyl having from about 8 to about 22 carbons, including typically a sulfate or sulfonate substituent group that has been base-neutralized, typically to provide an alkali metal, e.g., sodium or potassium, or an ammonium anion, including, for example:

(1) alkyl and alkylaryl sulfates and sulfonates having preferably 10 to 18 carbons in the alkyl group, which may be straight or branched chain, e.g., sodium lauryl sulfate and sodium dodecylbenzene sulfonate; (2) alpha-olefin aryl sulfonates preferably having from about 10 to 18 carbons in the olefin, e.g., sodium $C_{14-16}$ olefin sulfonate, which is a mixture of a long-chain sulfonate salts prepared by sulfonation of $C_{14-16}$ alpha-olefins and chiefly comprising sodium alkene sulfonates and sodium hydroxyalkane sulfonates: (3) sulfated and sulfonated monoglycerides, especially those derived from coconut oil fatty acids; (4) sulfate esters of (a) ethoxylated fatty alcohols having 1-10 mols ethylene oxide, e.g., sodium polyoxyethylene((7 mols EO) lauryl ether sulfate, and (b) ethoxylated alkyl phenols having 1-10 mols ethylene oxide and 8 to 12 carbons in the alkyl, e.g., ammonium polyoxyethylene(4 mol EO)nonyl phenyl ether sulfate; (5) base-neutralized esters of fatty acids and isethionic acid, e.g., sodium lauroyl isethionate; (6) fatty acid amides of a methyl tauride, e.g., sodium methyl cocoyl taurate, and (7) beta-acetoxy- or beta-acetamido-alkane sulfonates where the alkane has from 8 to 18 carbons, and (8) $C_8$–$C_{18}$ sarcosinates, e.g., sodium lauroyl sarcosinate.

Alpha-olefin sulfonates are the preferred anionic surfactants herein.

It has also been found that anionic fluorocarbon surfactants have the same stability enhancement benefit as the conventional anionic surfactants, in the compositions of the present invention, but typically are required at a much reduced concentration level. Examples of suitable anionic fluorosurfactants are the Zonyl series manufactured by E.I. duPont de Nemours and Co., especially Zonyls FSA, FSJ and RP, and the Flourad series manufactured by 3M Company, especially Flourads 120 and 128. A further general discussion of fluorosurfactants is provided in U.S. Pat. No. 4,511,489 to Requejo, et al., incorporated herein by reference thereto. The fluorocarbon surfactants are includable in the compositions of the present invention in an amount of up to about 1%, preferably from about 0.005 to about 0.1%, by weight of the composition. The stabilizer may comprise mixtures of said anionic fluorocarbon and said anionic surfactants.

Nonionic surfactants are preferably not included in the compositions of the present invention, said nonionic surfactants being generally unstable in the compositions. However, the presence of the anionic surfactant stabilizer also provides a stabilizing benefit to such nonionic surfactant-containing solutions. Although greater stability is shown for such compositions as compared to compositions containing the nonionic surfactant and the perfume but without the perfume stabilizer, the stability of the compositions of the present invention is lessened by the inclusion of the nonionic surfactant. For this reason, it is preferred not to include them, although they may be included in an amount of preferably less than about 1% by weight of the composition. Accordingly, commercial perfume preparations wherein the perfume has been solubilized by a nonionic surfactant may be included in compositions of the present invention. The stability of compositions containing both an anionic and a nonionic surfactant is by and large proportional to the concentrations of each therein.

Similarly, although not preferred, cationic surfactants in small concentration may be included in the compositions of the present invention. It is noted that cationic surfactants are typically incompatible with anionic surfactants, and in general tend to exhibit even less stability than anionic surfactant-stabilized compositions including nonionic surfactants.

It is preferred that the compositions of the invention contain no surfactant components which significantly interfere with or assist in the functioning of the anionic surfactant as a stabilizer. Ideally, no surfactant other than the anionic surfactant should be used. However, many commercial perfumes contain nonionic surfactants. Accordingly, nonionic surfactants, when used, will be present at concentration levels of 0.0001 to 1.0%, based on total composition weight. Cationic surfactants are generally excluded, i.e., are present in no significant amount.

Optionally, other adjuvants may be included in the compositions of the present invention, provided that such adjuvants do not exhibit incompatibility. For example, colorants, chelating agents, sequestering agents, builders, and the like may be included. With regard to colorants, in view of the presence of chromophores possibly reactive with the chlorite ion, care must be taken to screen properly the colorant used.

The present invention is illustrated by the examples below.

General

In the examples, a sample composition was deemed stable if chlorine dioxide gas is not formed within about one month of sample preparation.

In some instances, chlorine dioxide gas is easily detected by its characteristic odor. Where such sensory evaluations did not indicate the presence of $C10_2$, one of several analytical methods was used: (1) spectrophometric measurement of a sample, chlorine dioxide having a peak absorbance of 356 mm, unique among the oxy-chloro species; (2) titration of an alkaline sample with sodium thiosulfate in the presence of potassium iodide, and (3) purging $C10_2(g)$ from the sample with inert gas and passing the purge gas thorugh a potassium iodide solution.

In the specific examples which follow, all concentrations are reported on an active ingredient basis, unless otherwise indicated. The perfumes were premixed with the surfactants prior to the addition to the chlorite solution.

EXAMPLES 1-77

The compositions of Examples 1-77 contained 0.8% sodium chlorite, 4% surfactant as identified in Table 1 below, on an active-ingredient basis, 0.25% perfume as identified in Table 2 below on an "as-received" basis, and water. Each of the compositions was monitored for chlorine dioxide formation, the compositions being stored at 125° F. Storage at this temperature accelerates any interactions occurring in the compositions, one month's storage at 125° F. being roughly equivalent to six months' storage at room temperature. The results are provided in Table 3.

TABLE 1

SURFACTANTS TESTED

| Trade Name | Activity, % | Chemical Name |
|---|---|---|
| Anionic Surfactants: | | |
| Sipon ES | 27 | Sodium lauryl ether sulfonate |
| Bioterge AS-40 | 40 | Sodium alpha olefin sulfonate |
| Udet | 92 | Alkyl aryl sulfonate |
| Sipon WD | 30 | Sodium lauryl sulfate |
| Dowfax 3B2 | 45 | Sodium n-decyldiphenyloxidedisulfonate |
| Maprosyl 30 | 30 | Sodium lauroyl sarcosinate |
| Nonionic Surfactants: | | |
| Triton N-101 | 100 | Nonylphenoxypolyethoxy ethanol w/9.5 mols EO |
| Surfonic J-4 | 100 | Alkyl polyoxyalkylene ether |
| Neodol 91-8 | 100 | C9-C11 linear primary alcohol ethoxylate w/8 mol EO |
| Igepal CO-630 | 100 | Nonylphenoxy poly(ethyleneoxy) ethanol w/9 mol EO |
| Clindrol 200CGN | 100 | Coconut oil diethanolamide |

TABLE 2

PERFUMES TESTED

| Perfume | Type | Manufacturer |
|---|---|---|
| Dragoco 0/710531 | Fresh & Clean | Dragoco, Inc. |

TABLE 2-continued

PERFUMES TESTED

| Perfume | Type | Manufacturer |
|---|---|---|
| Florasynth S-1923 | Floral | Florasynth, Inc. |
| BBA 860416 | Green | BBA Co., Inc. |
| Florasynth T-4608 | Fruity (Green Apple) | Florasynth, Inc. |
| BBA 871523 | Citrus | BBA Co., Inc. |
| Dragoco 0/712227 | Pine | Dragoco, Inc. |
| Lautier LA-79-1946 | Powder Room | Lautier |

TABLE 3

STORAGE TEST RESULTS

Part A: Anionic Surfactants

| Example No. | Surfactant | Perfume | Days to Form Chlorine Dioxide |
|---|---|---|---|
| 1 | Sipon ES | Dragoco 0/710531 | >26 |
| 2 | " | Florasynth S-1923 | 5 |
| 3 | " | BBA 860416 | 18 |
| 4 | " | Florasynth T-4608 | 5 |
| 5 | " | BBA 871523 | >26 |
| 6 | " | Dragoco 0/712227 | >26 |
| 7 | " | Lautier LA-79-1946 | >26 |
| 8 | Bioterge AS-40 | Dragoco 0/710531 | >26 |
| 9 | Bioterge AS-40 | Florasynth S-1923 | >26 |
| 10 | Bioterge AS-40 | BBA 860416 | >26 |
| 11 | Bioterge AS-40 | Florasynth T-4608 | >26 |
| 12 | Bioterge AS-40 | BBA 871523 | >26 |
| 13 | Bioterge AS-40 | Dragoco 0/712227 | >26 |
| 14 | Bioterge AS-40 | Lautier LA-79-L946 | >26 |
| 15 | Udet-950 | Dragoco 0/710531 | >26 |
| 16 | " | Florasynth S-1923 | 4 |
| 17 | " | BBA 860416 | >26 |
| 18 | " | Florasynth T-4608 | 5 |
| 19 | " | BBA 871523 | |
| 20 | " | Dragoco 0/712227 | between 23 and 26 |
| " | | Lautier LA-79-1946 | >26 |
| 22 | Sipon WD | Dragoco 0/710531 | >26 |
| 23 | " | Florasynth S-1923 | 5 |
| 24 | " | BBA 860416 | >26 |
| 25 | " | Florasynth T-4608 | 18 |
| 26 | " | BBA 871523 | >26 |
| 27 | " | Dragoco 0/712227 | >26 |
| 28 | " | Lautier LA-79-1946 | >26 |
| 29 | Dowfax 3B2 | Dragoco 0/619531 | >26 |
| 30 | " | Florasynth S-1923 | 5 |
| 31 | " | BBA 860416 | >26 |
| 32 | " | Florasynth T-4608 | 5 |
| 33 | " | BBA 871523 | >26 |
| 34 | " | Dragoco 0/712227 | >26 |
| 35 | " | Lautier LA-79-1946 | between 23 and 26 |
| 36 | Maprosyl 30 | Dragoco 0/710531 | >26 |
| 37 | " | Florasynth S-1923 | between 9 and 11 |
| 38 | " | BBA 860416 | >26 |
| 39 | " | Florasynth T-4608 | 14 |
| 40 | " | BBA 871523 | >26 |
| 41 | " | Dragoco 0/712227 | >26 |
| 42 | " | Lautier LA-79-1946 | >26 |

Part B: Nonionic Surfactants

| Example No. | Nonionic Surfactant | Perfume | Days to Produce Chlorine Dioxide |
|---|---|---|---|
| 43 | Triton N-101 | Dragoco 0/710531 | between 23 and 26 |
| 44 | " | Florasynth S-1923 | 4 |
| 45 | " | BBA 860416 | between 23 and 26 |
| 46 | " | Florasynth T-4608 | 4 |
| 47 | " | BBA 871523 | 4 |
| 48 | " | Dragoco 0/712227 | between 23 and 26 |
| 49 | " | Lautier LA-79-1946 | >26 |
| 50 | Surfonic J-4 | Dragoco 0/710531 | >26 |

TABLE 3-continued

| STORAGE TEST RESULTS | | | |
|---|---|---|---|
| 51 | " | Florasynth S-1923 | 4 |
| 52 | " | BBA 860416 | >26 |
| 53 | " | Florasynth T-4608 | 4 |
| 54 | " | BBA 871523 | 5 |
| 55 | " | Dragoco 0/712227 | >26 |
| 56 | " | Lautier LA-79-1946 | >26 |
| 57 | Neodol 91-8 | Dragoco 0/710531 | 18 |
| 58 | " | Florasynth S-1923 | 4 |
| 59 | " | BBA 860416 | 18 |
| 60 | " | Florasynth T-460B | 4 |
| 61 | " | BBA 871523 | 5 |
| 62 | " | Dragoco 0/712227 | between 23 and 26 |
| 63 | " | Lautier LA-79-1946 | >26 |
| 64 | Igepal CO-630 | Dragoco 0/710531 | >26 |
| 65 | " | Florasynth S-1923 | 4 |
| 66 | " | BBA 860416 | >26 |
| 67 | " | Florasynth T-4608 | 4 |
| 68 | " | BBA 871523 | 5 |
| 69 | " | Dragoco 0/712227 | >26 |
| 70 | " | Lautier LA-79-1946 | >26 |
| 71 | Clindrol 200CGN | Dragoco 0/710531 | >26 |
| 72 | " | Florasynth S-1923 | between 9 and 11 |
| 73 | " | BBA 860416 | >26 |
| 74 | " | Florasynth T-4608 | 19 |
| 75 | " | BBA 871523 | 5 |
| 76 | " | Dragoco 0/712227 | >26 |
| 77 | " | Lautier LA-79-1946 | >26 |

EXAMPLES 78–106

The compositions of Examples 78–106 were prepared and monitored for stability. Each of the Examples 78–106 contained 0.8 sodium chlorite and a surfactant in an amount as indicated in Table 4 below. Examples 78–86 (Group A) contained 0.1% of a commercial perfume on an "as received" basis, which perfume is manufactured by Fritzsche Dodge & Olcott Co., Inc. and includes essential oils, gernaiol and other alcohols, acetates such as isobornyl acetate, and eugenol on other phenols. Examples 87–96 (Group B) contained, in lieu of said commercial perfume, 0.1% methyl salicylate, and Examples 97–106 (Group C) contained, in lieu of a perfume, 0.1% glycerin.

TABLE 4

| Example Nos. | | | | Surf. Conc. (Wt. % |
|---|---|---|---|---|
| Group A | Group B | Group C | Surfactant | Active) |
| 78 | 87 | 97 | Bioterge | 2 |
| 79 | 88 | 98 | Sipon WD | 5 |
| 80 | 89 | 99 | Flourad FC-129(1) | 0.025 |
| 81 | 90 | 100 | Triton X-100 | 5 |
| 82 | 91 | 101 | Surfonic J-4 | 5 |
| 83 | 92 | 102 | Flourad FC-171(2) | 0.05 |
| 84 | 93 | 103 | Igepal CO-630 | 5 |
| 85 | 94 | 104 | Neodol 25-9(3) | 5 |
| 86 | 95 | 105 | BTC 2125M(4) | 2.5 |
| | 96 | 106 | Dowfax 3B2 | 2.25 |

(1)Anionic fluorocarbon surfactant manufactured by 3M Company; about 50% active.
(2)Nonionic fluorocarbon surfactant manufactured by 3M Company; 100% active.
(3)$C_{12}$–$C_{15}$ linear primary alcohol ethoxylate w/9 mol EO per molecule manufactured by Shell Chemical Company; 100% active.
(4)Cationic surfactant mixture of dodecyl dimethyl ethylbenzyl and myristyl dimethyl benzyl ammonium chlorides manufactured by Onyx Chemical Co.; about 50% active.

The compositions of Examples 78–106 were monitored for up to 28 days, storage being at 125 F. No chlorine dioxide was formed within the 28-day period in Examples 78–80, 87, 97, 102, 105, and 106.

EXAMPLES 107–109

The following compositions in Examples 107–109 were prepared, and further represent compositions in accordance with the invention. All concentrations are reported on an active-ingredient basis except for the perfumes which are "as received."

TABLE 5

| | Concentration, Wt. % | | |
|---|---|---|---|
| Constituent | 107 | 108 | 109 |
| Sodium chlorite | 1.6 | 1.6 | 1.6 |
| Alpha olefin sulfonate | 6 | 6 | 6 |
| Sodium borate | 1 | 1 | 1 |
| Sodium carbonate | 1 | 1 | 0 |
| Perfume per Examples 78–86 | 0.25 | 0.25 | 0.1 |
| Dye | 0.66 | 2 | 0.67 |
| Water | (By difference) | | |

None of these compositions produced chlorine dioxide.

We claim:

1. A stable aqueous, alkaline cleaning composition comprising on a weight basis about 5% or less of an alkali metal halogenite; from about 0.01 to about 3% of a perfume normally chemically incompatible with said halogenite in aqueous media, and a stabilizer that is an anionic surfactant, said stabilizer being present in the composition at least in an amount effective to stabilize the composition as evidenced by a substantial absence of chlorine dioxide in the composition, wherein the composition contains no surfactant components which interfere with or assist in the functioning of the anionic surfactant as a stabilizer.

2. The composition of claim 1 wherein the compositon has a pH of about 9 and above.

3. The compositon of claim 2 wherein the perfume comprises an essential oil.

4. The composition of claim 2 wherein the perfume comprises fragrance constituents selected from the group consisting of geraniol, citronellol, terpineol, citral, citronellal, eugenol, ionone, isobornyl acetate, isoamyl salicylate, methyl salicylate, gamma nonyl lactone and mixtures thereof.

5. The composition of claim 2 wherein the anionic surfactant is selected from the group consisting of alkali metal salts of: (1) alkyl and alkylaryl sulfates and sulfonates having 10 to 18 carbons in the alkyl group, which may be straight or branched chain; (2) alpha-olefin aryl sulfonates having from about 10 to 18 carbons in the olefin; (3) sulfated and sulfonated monoglycerides; (4) sulfate esters of (a) ethoxylated fatty alcohols having 1–10 mols ethylene oxide, and (b) ethoxylated alkyl phenols having 1–10 mols ethylene oxide and 8 to 12 carbons in the alkyl; (5) base-neutralized esters of fatty acids and isethionic acid; (6) fatty acid amides of a methyl tauride; (7) beta-acetoxy- or beta-acetamido-alkane sulfonates where the alkane has from 8 to 18 carbons, and (8) acyl sarcosinates having 8–18 carbons.

6. The composition of claim 3 or 4 wherein the anionic surfactant is selected from group consisting of alkali metal salts of $C_{12}$–$C_{18}$ aryl sulfonates; $C_{12}$–$C_{18}$ sulfates; $C_{12}$–$C_{18}$ sulfonates; $C_{12}C_{18}$ sulfates; $C_{12}$–$C_{18}$ sarcosinates; n-decyl-diphenyloxide disulfonate, and anionic fluorosurfactants.

7. The composition of claim 2 wherein the halogenite is sodium chlorite.

8. The composition of claim 6 wherein the halogenite is sodium chlorite.

9. An aqueous, alkaline cleaning composition comprising on a weight basis from about 0.5 to about 5% sodium chlorite; from about 0.01 to about 1% of a stabilizable perfume normally chemically incompatible with the said sodium chlorite in said aqueous composition, and an anionic surfactant perfume stabilizer selected from the group consisting of alkali metal salts of: (1) alkyl and alkylaryl sulfates and sulfonates having 8 to 18 carbons in the alkyl group, which may be straight or branched chain; (2) alpha-olefin aryl sulfonates having from about 10 to 18 carbons in the olefin; (3) sulfated and sulfonated monoglycerides; (4) sulfate esters of (a)ethoxylated fatty alcohols having 1-10 mols ethylene oxide, and (b) ethoxylated alkyl phenols having 1-10 mols ethylene oxide and 8 to 12 carbons in the alkyl; (5) base-neutralized esters of fatty acids and isethionic acid; (6) fatty acid amides of a methyl tauride; (7) beta-acetoxy- or betaacetamido-alkane sulfonates where the alkane has from 8 to 22 carbons, (8) acyl sarcosinates having 8 to 10 carbons, and (9) fluorocarbon surfactants and mixtures thereof, said stabilizer being present in the composition in at least an amount effective to stabilize the composition but in an amount of less than about 20%, stability of said perfume being evidenced by the substantial absence of chlorine dioxide in said composition, said compositon having a pH of about 9 and above and containing no surfactant components which interfere with or assist in the functioning of the anionic surfactant as a stabilizer.

10. The composition of claim 9 wherein the pH of the composition is from about 9.0 to about 10.5.

11. The composition of claim 10 wherein the anionic surfactant is an amount of from about 1 to about 10%.

12. The composition of claim 11 wherein the anionic surfactant is an anionic fluorosurfactant, said fluorosurfactant being present in an amount from about 0.005 to about 1%.

13. The composition of claim 11 wherein the sodium chlorite is present in an amount of from about 1 to about 5%.

14. The composition of claim 11 wherein the perfume comprises an essential oil.

15. The composition of claim 11 wherein the perfume comprises a fragrance selected from the group consisting of geraniol, citronellol, tergineol, citral, citronellal, eugenol, ionone, isobornyl acetate, isoamyl salicylate, methyl salicylate, gamma nonyl lactone and mixtures thereof.

16. The composition of claim 11, 14, or 15 wherein the perfume is selected from the group consisting of alkali metal salts of $C_{12}$–$C_{18}$ alkyl ether sulfonates; $C_{12}$–$C_{18}$ alkyl olefin sulfonates; $C_{12}$–$C_{18}$ alkyl aryl sulfonates; $C_{12}C_{18}$ alkyl sulfates; $C_{12}$–$C_{18}$ alkyl sarcosinates; n-decyl-diphenyloxide disulfonate, and anionic fluorosurfactants.

17. The compositon of claim 13, 14 or 15 wherein the anionic surfactant is a $C_{12}$–$C_{18}$ alkyl alpha olefin sulfonate.

18. The composition of claim 10 further comprising one or more out of the following adjuvants: dyes, buffers, chelating agents, and diluents, said adjuvants being included in amounts effective to provide their intended function.

19. A method of stabilizing an aqueous alkaline cleaning composition which contains a perfume and an alkali metal halogenite which comprises the step of adding to said composition up to 20% by weight of an anionic surfactant, wherein the compositon contains no surfactant components which interfere with or assist in the functioning of the anionic surfactant as a stabilizer.

20. The method of claim 19 wherein the surfactant is selected from the group consisting alkali metal salts of $C_{12}$–$C_{18}$ ether sulfonates; $C_{12}$–$C_{18}$ olefin sulfonates; $C_{12}$–$C_{18}$ aryl sulfonates; $C_{12}$–$C_{18}$ sulfates; $C_{12}$–$C_{18}$ sarcosinates; n-decyl-diphenyloxide disulfonate, and anionic fluorosurfactants.

21. The method of claim 20 wherein the perfume consists essentially of at least one terpine or at least one oxygenated derivative thereof.

22. The method of claim 20 wherein the perfume is selected from the group consisting of geraniol, citronellol, terpineol, citral, citronellal, eugenol, ionone, isobornyl acetate, isoamyl salicylate, methyl salicylate, gamma nonyl lactone and mixtures thereof.

* * * * *